United States Patent [19]

Stephens

[11] Patent Number: 4,763,336
[45] Date of Patent: Aug. 9, 1988

[54] SWITCHING GAS-DISCHARGE ION LASERS

[76] Inventor: F. Clark Stephens, 2315 Overland Ave., Los Angeles, Calif. 90064

[21] Appl. No.: 855,451

[22] Filed: Apr. 24, 1986

[51] Int. Cl.$^4$ ............................................... H01S 3/03
[52] U.S. Cl. ...................................... 372/81; 372/33; 372/34; 372/38; 372/61
[58] Field of Search .................. 372/61, 25, 33, 29, 372/38, 81; 315/163, DIG. 5, DIG. 7

[56] References Cited

U.S. PATENT DOCUMENTS

3,626,325 12/1971 Smith .................................... 372/61
4,555,647 11/1985 Leskovec et al. .................... 315/163
4,606,034 8/1986 Eden et al. ............................. 372/87

Primary Examiner—Léon Scott, Jr.
Assistant Examiner—L. Church
Attorney, Agent, or Firm—Freilich, Hornbaker, Rosen & Fernandez

[57] ABSTRACT

Most gaseous ion lasers run with continuous drive and operate under steady state thermal conditions. They cannot be driven according to the needs of the application, and their kilowatts of waste heat must be removed from the working environment. A fast transient effect, ion loss to the wall of the bore, is dealt with by presaturating the wall during novel bore-conditioning pulses applied at startup. Additional improvements provide denser gas during this step, otherwise only small bore tubes could be presaturated. Other improvements provide means for overcoming the transient effect of discharge gas pumping. And a thermal thinning of the column gas is avoided by means of a novel gas density regulation. The result is a switched, dynamically operating gas laser, whose drive can follow the peak needs of the application while its waste heat is averaged to a low output level acceptable in the working environment.

17 Claims, 4 Drawing Sheets

SWITCHING GAS-DISCHARGE ION LASERS

This invention relates to dynamically operating gas-discharge ion lasers of the type shown in U.S. Pat. No. 3,626,325 issued to Smith, and more particularly to (1) improvements for controlling ion loss to the wall of the bore, (2) improvements for cancelling steady-state and transient gas pumping effects, (3) improvements for regulating the gas density as the average tube drive varies, and (4) further improvements of tube construction and method of operation which cooperate with the foregoing improvements to enable, in existing sizes of such lasers, longer lasting pulses, wider excursions of tube drive, and improved efficiency of light generation. In larger scale lasers of the type, the upper limits of peak and average power and of pulse energy are raised.

BACKGROUND OF THE INVENTION

Noble gas ion lasers were reduced to practice twenty years ago, and since that time the continuous wave (CW) argon and krypton types have dominated all other laser types in applications requiring high average power in the visible spectrum. The continuing search for new laser media has turned up nothing to replace them. The incentive to replace them has been strong, particularly in high power applications, because they require that kilowatts of waste heat be removed from their working environment. By definition their discharge tubes must run continuously, because their critical gas density is established and stabilized from a higher cold-fill pressure, in a slow process of thermal driveout that can take minutes to reach equilibrium.

The reader can best appreciate the practical limitations of the continuous laser by considering an analogy between it and an electric motor. Imagine an electric motor that draws full rated current for any shaft speed selected, regardless of whether there is load on the shaft. In the analogy shaft speed represents laser power setting. This hypothetical motor may be doing no work at all, yet has to draw the same current it would if fully loaded at the same speed. This burden might be overlooked if the motor was reasonably efficient, but it is not. The heat would drive people from the workplace, so it must be removed, by putting it into water that goes down a drain or into air that is vented outdoors. Imagine how many motors having such a requirement would find application. This analogy represents the existing requirement of continuous wave ion lasers producing 1 watt or more of output. It is clear that only the unique properties of laser light, and the lack of alternative sources, can explain the numbers of such lasers in service.

Most of the work of these lasers, including the medical treatments, is performed without needing continuous output. In fact, it would be impossible to treat with a laser continuously. A laser surgeon uses far more off-time than on-time.

A second species of ion laser, the REPETITIVELY-PULSED type, has been a practical, but limited, alternative to the CW ion laser. Its characteristic bore dimensions are larger and its pulse currents are higher. Its pulse power may be ten times that of the equivalent continuous laser, so it needs only a burst of pulses at ten per cent duty factor to deliver the same average power. Furthermore, it can be air cooled if, between the high-duty bursts, it can idle at low enough duty factor to average the heat dissipation to a level the room space will tolerate. Of course the tube design must be such that the gas's thermal expansion during increases of duty factor does not thin it so much as to destabilize the output or cause arc starvation (current interruption). Starting with a higher fill pressure, in anticipation of gas thinning, is not the answer because then the tube would lose output stability at low duty factors due to a dense-gas effect known as radiation trapping.

To the present time, there has been one repetitively-pulsed gas laser that can tolerate changes of duty factor. It is the novel design patented in 1971 by Michael R. Smith (U.S. Pat. No. 3,626,325), in which the discharge column gas density is kept within critical limits, as the average demand on the tube varies, by surrounding the bore with an envelope containing near-vacuum gas, and causing radiative transfer to be the main method of heat disposal. Since radiative transfer varies as the fourth power of the absolute temperature large changes of power input result in relatively small changes of bore temperature. This moderating effect reduces thermal drive-out of the gas and keeps the column density within acceptable limits over a useful duty-factor range. The Smith laser has functioned well in a number of applications that did not require pulses longer than about 150 microseconds.

The pulsed gas laser tubes that preceded the Smith laser were convectively cooled, so their heat transfer was a first power function of temperature. They could barely double their duty factor without going out of gas-density range, and they delivered only tens of milliwatts of average power.

In what is known as "burst" mode the Smith laser has been able to deliver over two watts of average power, more than enough to perform treatments of the eye, without needing heat disposal methods that continuous lasers in the same application require. During the individual treatment exposures a rapid mixing of pulses and off-times is equivalent to continuous delivery of energy if the pulsing is faster than the thermal response time of the tissue and if the same energy is delivered in the same time interval. But the Smith-type laser offers a versatility of treatment not possible with continuous lasers. If the surgeon wishes to control the depth and spread of thermal tissue effects he can do so by varying the pulse duration and repetition rate. If he makes the pulses very long and the spot size very small the characteristically high pulse power yields enough energy density within the time of individual pulses to enhance evaporative effects in tissue-perforating processes such as are used for glaucoma treatment. Thermal damage to surrounding tissues is reduced, and it could be reduced further if pulses longer than 150 microseconds were possible.

In all types of applications there is another important advantage of the Smith-type laser. It can maintain nearly optimum efficiency at low power delivery as well as high, because of its pulsed-current excitation. It lowers its delivered power by lowering either the frequency or the duration of its pulses, while still driving each pulse with an efficient, high-level current. A CW laser can only reduce its power by reducing its current, and its efficiency is steeply reduced as it does so. Furthermore, the method of lowering the current in CW lasers is to drop some of the supply voltage across series-connected pass transistors, a dissipative process that adds to the power waste and to the water cooling needed. Even the transistors are water cooled. The Smith-type lasers can be turned on and off by switching-mode transistors, so their power control is non-dissipative.

Advantages of Dynamic Operation

A laser discharge tube that does not have to run 100 per cent of the time does not have the same practical limits on bore diameter as a tube which, by definition, must sustain its current continuously. CURRENT DENSITY in the bore cross-section is the efficiency-determining parameter, so the current should theoretically go up as the square of the diameter. One can readily see that continuous current imposes a practical limit on bore size, and it is unfortunate because laboratoy CW lasers with 10 and 12 mm bores have revealed efficiencies five to ten times greater than those of commercial CW ion lasers. These tubes have delivered more than 100 watts, but they required more than a hundred kilowatts of drive and hence have had no commercial realization.

LIMITATIONS OF THE SMITH TUBE

The Smith tube succeeded because it moderated thermally-generated changes of gas density in the active column. But other faster causes of density loss, occuring within the time of one pulse or a few pulses, were not addressed. During long pulses, or very-high-duty bursts, rapid thinning of the gas occurs due to ion loss to the wall of the bore. Ion loss is a faster effect than thermal driveout because of the velocities of the ions and the short distances they travel to reach the wall.

The Smith tube also did not address the transient effect of gas pumping by the discharge, which is more harmful in dynamic operation than it is in steady-state lasers, because the standard solution for it, the gas-return tubing that joins the two ends of the tube, has inherently slow response, and because it is even slower at the low gas densities of pulsed type lasers. So these faster causes of gas depletion, ion loss and gas pumping, remain as the principal limitations on the dynamic performance of the Smith-type laser. Until the present invention there have been no improvements to correct them, perhaps because the Smith laser has been adequate for the eye treatment systems that became its principal use.

When ion loss and gas pumping transients occur separately or together the limiting condition is the onset of arc starvation. Arc starvation is a chopping of the tube current that occurs when the transient losses of ions and atoms from the column deplete the reserve from which ions are made. Without enough ions the column is unable to sustain the current and chopping occurs.

Ion Loss to the Wall

Ion loss is not a problem in continuous (CW) ion lasers because a wall saturation of ions and electrons is established during the buildup of current that occurs as the gas density is being driven down. Saturation has the effect of returning to the gas column the same numbers of neutral atoms as are going to the wall as ions. In the present art of pulsed ion lasers no equivalent process has been devised to handle the peaks of ion loss that result from dynamic operation. Saturating the wall is theoretically possible, but to anticipate the peaks it would have to be saturated in advance, or "pre-saturated". Particles are kept on the wall for a time by their electrostatic charges, so a bore material with very high electrical resistivity can be part of the means for maintaining the saturated condition.

Transient Gas Pumping in the Smith Tube

The excitation current in gas discharges causes a transporting of neutral gas along the column. It is the result of a combination of particle effects, and their net effect could be in either direction, depending upon the discharge parameters, but in the realm of continuous and pulsed ion laser discharges the pumping is toward the anode of the tube. The simplest and most effective means in the present art for limiting the pressure and density differences that pumping causes has been the use of a gas return tubing connecting the two end volumes. The Smith laser has always used such a tubing.

The return tubing seems to be an adequate solution at the higher fill pressure and more-slowly-varying drive conditions of the continuous laser, but at the lower pressure characteristic of the Smith laser the gas movement through the return tubing is more of a diffusion than a flow, and sudden increases in the rate of gas pumping are not matched by the rate at which gas can travel through the return tubing, so a pressure and density gradient along the length of the column lowers the efficiency of light generation, and in the worst case leads to arc starvation in the cathode end of the bore.

A switched tube designed for high output power and dynamic operation needs means for limiting density gradient in its active column.

Thermal Driveout In The Smith Tube

When the Smith laser is operated with large changes of duty factor its tube design only moderates the thermal driveout. It still thins the gas significantlty, although it does so much more slowly than ion loss and gas pumping thin it. Consider this example: If each burst of pulses has a pulse rate that is ten times that of the standby mode, and the bursts are supplied 40 percent of the time, the overall duty increase is a factor of four (10×0.4). Since the bursts often repeat long enough to approach a new thermal equillibrium the bore temperature must go up by the fourth root of four to dispose of the increased heat input. The fourth root of four is 1.41, so there is a 41% increase in the bore's absolute temperature. A proportional expansion of the gas inside the bore causes a pressure front that moves gas into cooler parts of the tube. Hence the bore loses gas until an equillibrium is reached or until there is a reduction in the average duty factor. The harder the tube is driven the thinner the bore gas becomes. What is needed, at the least, is a regulation that holds the density constant, but if the density can be made to increase with the average duty factor higher power output and a wider range of efficient operation can be achieved.

Bore Diameter Discontinuities in the Thermal Expansion Gaps

The bore enclosure of the Smith-type laser that forces radiative cooling remains far cooler in operation than the bore itself does, so a difference in longitudinal thermal expansion must be anticipated. Smith provided a single-piece tubular bore that slips into deep counter-bores in the throat members whose depth allows for the maximum "hot" length. However the space that provides for the expansion is a discontinuity of bore diameter that causes abnormal fields in the discharge, which contribute to early arc starvation. And in the Smith design the bore is free to slide, so the discontinuity can be in either or both throats. It is particularly undesirable to have it in the cathode throat because that location is already vulnerable to early arc starvation because of the gas pumping already described.

Large bore versions of the Smith laser have been tested in attempts at high power operation, but ion loss and gas pumping effect caused arc starvation, except when pulses were kept short and excursions of duty factor were kept small. Hence there was little benefit from these scaled-up tubes and they were not put into production.

An improved Smith-type tube, created specifically to control rapid gas density transients, and to regulate gas density over a wide range of duty factors, would be able to serve in many commercial applications while operating in switching mode.

SUMMARY OF THE INVENTION

In a pulsed gas laser of the type described by Smith, having a source of gas, an anode, a cathode, means for providing a defined path through the gas for an electrical discharge between the anode and cathode, the means including an elongated tubular bore of a refractory ceramic which defines the active column in which lasing action occurs, an envelope surrounding the bore and enclosing it in a low density gas medium that causes heat to be removed from it by radiative transfer through and to the envelope, a gas return tubing joining its two ends, and a power supply coupled to the anode and cathode by switching transistors that switch the excitation current on and off from a lower level of keep-alive current to produce output pulses, the ion loss transient can be minimized by an improved method of operation comprising steps for applying a series of bore-conditioning pulses, at the time of startup before the tube has been heated, whose function is to establish a PRE-SATURATION or near-saturation of ions and electrons on the wall of the bore. The process requires pulses having a choice of parameters to be effective in saturating tubes having a wide range of bore dimensions which could be filled with any of the inert gases and metal vapors that ion lasers use. The three pulse parameters, duration, interpulse period and number of pulses, may be predetermined, which could mean holding each constant throughout the series of pulses, or having each change in a predetermined way during the series of pulses, or could use a method combining a mix of predetermined constant and predetermined changing parameters.

When the tube is of a two-directional type introduced below the alternating of current direction of the pulses can further define the pulses, so methods using unidirectional pulses and methods using alternating two-direction pulses are defined.

In another improved method of operation the first pulses may be predetermined, and later pulses allowed to continue until arc starvation occurs, which provides a method for measuring the duration and to determine therefrom the progress toward saturation and the completion of saturation, and for using that determination to initiate a step for changing to the standby mode of pulsing that maintains the saturation. The saturation "progress" signal can even provide the means for adjusting subsequent pulse parameters such as interpulse periods. The bore-conditioning pulses are applied at startup before the tube is heated so that the column contains as many gas atoms as possible. In the Smith-type tube the bore enclosure causes virtually all of the heat energy of the first pulses to be retained by the bore until it gets hot enough to radiate, and this temperature rise will drive some of the gas out through the ends of the bore before it can be put on the wall. No gas can enter the column during the pulses so gas atoms used in the process must be already there at the outset, and the bore-conditioning will have its greatest effect while thermal inertia is delaying the temperature rise. Without improvements to increase the gas content only very small bores can be pre-saturated.

To extend this capability to bore diameters of commercial significance requires an increase of starting gas density. Before describing construction and methods for obtaining this increase the SUMMARY introduces improvements of tube construction and operating methods used for REGULATING the gas density as average duty factor varies, because some of the construction for this purpose is also used to densify the gas for the bore-conditioning process.

By making all of the enclosed gas volume, specifically that of the bore housing, the cathode and anode vessels, and the gas return tubing, surround the bore, anode and cathode in such a way that their envelopes are heated by infra-red radiation from the bore, anode and cathode that is roughly proportional to the average duty factor, and extracting heat from their envelopes by rate-selectable means whose rate determines their temperature rise, and in the fixed volume determines the pressure rise of the gas within them, there is established, with reference to their pressure at standby conditions, a pressure function, that is steeper than the moderated temperature and pressure functions occuring within the bore due to its radiative cooling, and therefore able to prevail in an equilibrating of these two pressures that determines the quantity of envelope gas that will move into the bore and hence the amount by which the gas density in the column will increase with an increase of tube drive.

Because the tube does not have a compartment that remains cool, such as the ballast of the Smith tube, there is no place where gas from the bore can be driven as bore temperature goes up, as in the 41% temperature increase cited in the example. However, there are useful purposes that an appended volume can serve, that reward the addition of a ballast and ballast valve to the tube, as will be seen.

When an appended, unheated ballast, shielded from the tube radiation, is joined through a remotely-operable valve to the tube whose construction was just described, and the valve is kept closed except during steps to transfer gas, the ballast cannot be a place to which gas can retreat from the heated section, so the same positive function of gas density versus tube drive can be realized.

The valved construction also makes possible a method of operation permitting a higher-than-usual fill pressure, a reserve of gas in the ballast, and a step to set the correct pressure for laser operation at the time of each startup. The method uses the application of current pulses of high average heat content to the tube, with the ballast valve open, for a long enough time for the heating of the gas in the hot section envelopes to push surplus gas into the ballast until a pressure sensor in the hot section reads the correct pressure for the particular tube and gas medium, at which time steps are applied to close the valve and to change the pulsing to that of standby operation.

An additional improvement of tube construction used with the ballast valve enables an additional improvement of operating method which permits yet-higher fill pressure and a longer-lasting reserve of gas in the ballast. The discharge column's characteristic pumping action, which is both faster and more effective than thermal driveout, is applied to the task of driving gas into the ballast. The ballast valve is placed so that the ballast is joined to the hot section at its anode end. Pumping direction makes this end have the higher pressure. A second valve is used that is capable of temporarily closing the gas return tubing, causing the gas to be pumped into the ballast. The pressure sensor again detects the right pressure and opens the gas return valve while closing the ballast valve, then switches the discharge to standby mode.

If dual cathodes and anodes are used in a tube without a ballast or ballast valve as described above, and external pairs of switching devices are added for alternating the direction of current pulses, the laser has the ability to cancel harmful gas-pumping effects, while eliminating the need for a gas return tubing.

When an appended, unheated ballast shielded from the tube radiation is joined, through a remotely-operable valve, to the two-directional tube whose construction was just described, and the valve is kept closed except during steps to transfer gas, the ballast cannot be a place to which gas can retreat from the heated section, so the same positive function of gas density versus tube drive can again be realized. And it is realized while eliminating the gas return tubing, so it eliminates the need for a gas return valve, and still enables pumping effect to be used for the same increasing of tube fill and gas reserve and for the same pressure-setting at startup as were described for a single-direction tube.

In a pulsed gas laser of the type described by Smith, in which an envelope surrounds the bore and encloses it in a low density gas medium to cause its heat to be removed largely by radiative transfer through and to the envelope, and in the tubes of improved construction described above, an improved method of operation is described using steps during laser operation for blocking the movement of gas from the normally-heated vessels making up the tube volume into any normally-unheated vessel or vessels, when there are such, and using further steps for extracting heat from the envelopes of the normally-heated vessels by rate-selectable means whose rate determines their temperature rise, and in the fixed volume determines the pressure rise of the gas within them, to establish, with reference to their pressure at standby conditions, a pressure function that is steeper than the moderated temperature and pressure functions occuring within the bore due to its radiative cooling, and therefore able to prevail in an equilibrating of these two pressures that determines the quantity of envelope gas that will move into the bore and hence the amount by which the gas density in the column will increase with an increase of tube drive, including the case of no net gas movement and no increase in the column gas density when, at a given drive level, the relative increase in envelope absolute temperature matches that of the bore absolute temperature.

A further improved method of operation is realized when the rate-selectable method for extracting heat from the tube envelopes is selected from a group of methods which provide continuously-varying control over the rate at which heat is extracted.

The valved tubes which use thermal driveout or discharge gas pumping to enable higher fill pressure can also be used to advantage with the pre-saturating methods described, because their higher fill pressure provides an increase in the number of atoms present in the bore at the start of the bore-conditioning pulses, thereby improving the ability of the pulses to pre-saturate larger-bore tubes. The applied pulses can be any type or comhination of types that suits the saturating requirement of the particular tube and gas medium, including, but not limited to, those described above.

The improved method of operation which provides the increased number of gas atoms in the bore for the pre-saturation process in single-direction or two-direction tubes having an appended volume such as a ballast and a means for blocking the passage of gas into or out of the appended volume, applies steps, at startup while the tube is still unheated, for unblocking the passage to release and uniformly distribute the gas contained in the appended volume, then steps for blocking the passage, for applying bore-conditioning pulses of the type selected, further steps immediately thereafter for unblocking the passage and changing the tube drive to high duty pulses for thermal driveout, and in the tubes that have a gas return tubing and a means for blocking the passage of gas through the gas return tubing, further steps for blocking the gas return tubing and for changing to a gas pumping mode using repetitive pulses or continuous glow current whose direction pumps gas toward the appended volume, with steps for continuing the thermal driveout or pumping process until the correct pressure for laser operation is sensed, causing a step for changing the tube drive to the standby pulsing that maintains saturation of the wall through times of low tube drive.

A two-directional tube with switching devices which can provide either direction of current flow can be used with the pre-saturating method and with an improved method of operation in which pumping in a second direction provides a further substantial increase in the number of gas atoms in the column at the start of the bore-conditioning pulses. By first pumping in the direction cited above it enbles the same higher fill pressure and extra gas in the ballast, then the pumping discharge is applied to the bore in the opposite direction to "exhaust" gas from the ballast and "pack" it into a volume making up the majority of the hot section volume. If this additional step is applied at the time the laser is being shut down the tube parts will be cool when the pre-saturation process is applied at startup.

The diameter discontinuities in the bore expansion device of the Smith tube can be avoided in all of the improved tube embodiments of the present invention by making the bore and throat assembly as one piece and providing for it to be supported at the two throats in such a way that one end retains it and the other end allows it to slide in a collar as the bore grows in length. The throat at one end has slotted openings through the tapered part of its wall to allow communication of gas between the bore envelope and the active column. In single-direction tubes the vented throat is put at the cathode end so that the vents in the throat can be the path by which the envelope volume can resupply transient quantities of gas that have been pumped toward the anode by the discharge. The close fit of the opposite, unvented throat to its collar prevents arcing of the discharge down the outside of the bore to the anode.

When larger diameter bores must be pre-saturated the lower gas density at which they operate to generate their light output and the larger wall area to be saturated combine to make the task more difficult. The area requiring saturation can be reduced by treating the wall with small, randomly-distributed spots of a refractory metal at a density sufficient to reduce the non-conductive wall area but insufficient for random overlapping of spots to provide a continuous current path to short out the excitation.

BRIEF DESCRIPTION OF THE DRAWINGS

Each of the figures has a side view of its tube, shown partly in cross-section, with a block diagram of the external components used for applying excitation current or pumping current to the discharge and for managing its gas medium. FIG. 3a shows only the tube and assumes the same circuit block diagram as that used with the tube of FIG. 1.

DESCRIPTION OF THE PREFERRED EMBODIMENTS

The drawings of tubes included in FIGS. 1, 2, 3a and 3b are not to scale. The bore lengths are shortened so that other features can be presented at larger scale.

Figure 1:
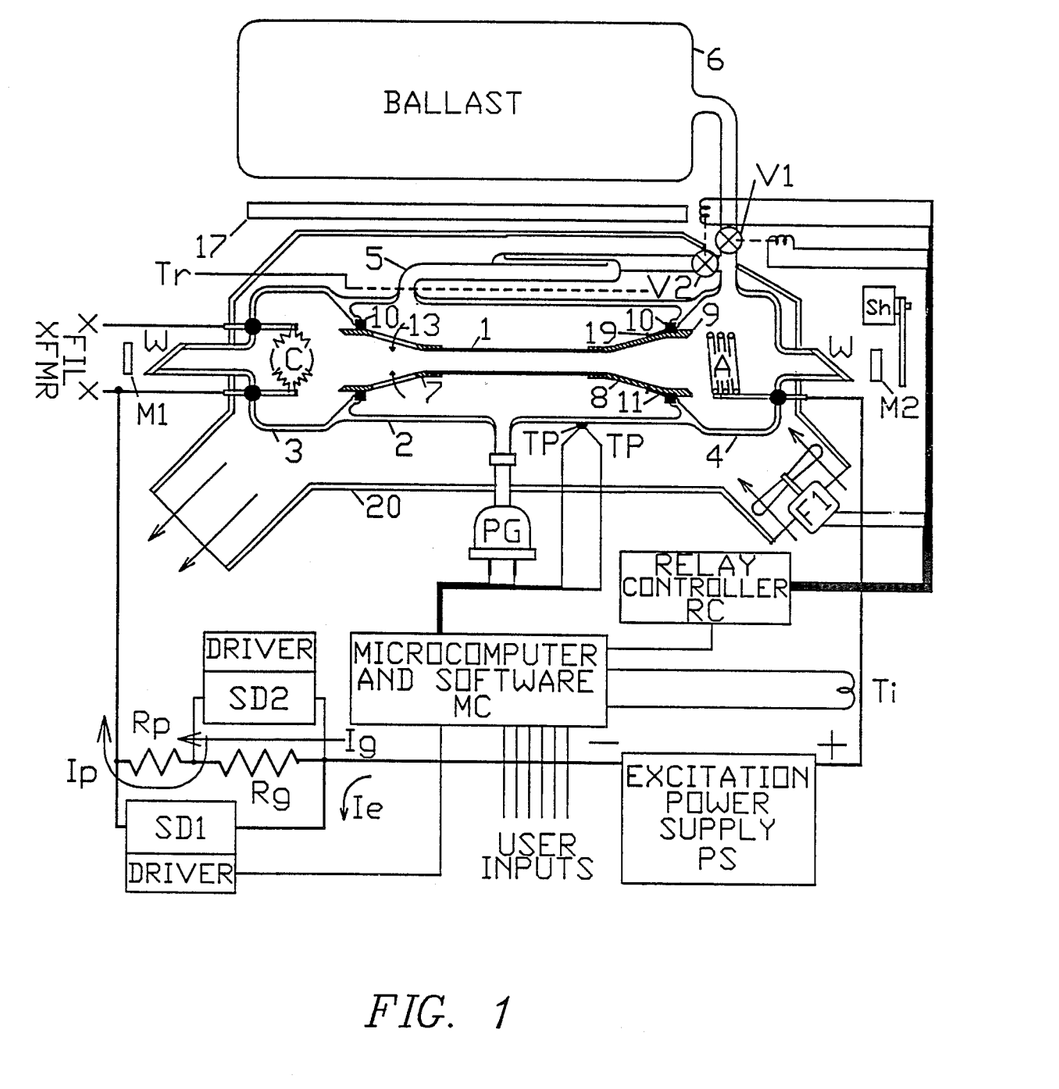
FIGS. 1 and 2 schematically illustrate embodiments of improved tube apparatus and external devices in which the hot and cool sections of the tube are separated by a valve. The tube of FIG. 1 provides for single-direction discharge current and that of FIG. 2 for two-direction discharge current.

FIG. 1 is used for the initial description because the single direction tube is basic to the description of all the tubes. The microcomputer MC turns the tube's excitation pulses and the tube's gas pumping current on and off by means of electronic switching devices SD1 and SD2, each being turned on and off by a driver, designated in the rest of the figures by the letter D. The role of the driver will not always be mentioned, but it is a necessary adjunct to every high current electronic switching device.

The microcomputer also operates other tube devices such as the valves V1 and V2, the envelope fan F1, and the heater of the cathode C, requiring currents higher than a microcomputer provides, hence the intervening role of the relay controller RC, whose function will also be assumed in the description.

The microcomputer receives and processes inputs from the current-sensing transformer Ti, the pressure gauge PG, and the temperature probe TP, and uses such information, the timing ability of its clock, and the data storage ability of its memories, for applying bore-conditioning pulses with appropriate parameters for pre-saturating, and keeping saturated, the wall of the bore, as well as steps for starting up and shutting down the laser, transferring gas when needed and controlling the output pulses as the laser does its work. The alternative to a microcomputer would be analog elctronic devices and other specialized integrated circuits, but the microcomputer is preferred for its unique ability to let standardized hardware control a wide variety of lasers tubes in a broad range of applications through changes in software.

Discharge Tube Construction

Applications of ion lasers are many and varied, and this is particularly true of the switched ion laser because of the versatility enabled by variable pulse width, variable pulse rate, and random duty operation, and the differences of beam coherence and bore diameter that applications can require. Therefore, there is not one preferred tube embodiment. Four generic embodiments are described and claimed, all of which derive from the enclosed, radiatively-cooled bore in the 971 1 tube patent (U.S. Pat. No. 3,626,325) issued to Michael R. Smith. The descriptions of that patent are incorporated by reference. Improvements, additions and deletions will be apparent.

Some of the improvements would apply to any discharge tube whose bore was largely radiatively cooled, but the figures show a bore enclosure 2, like that of the Smith tube, as the preferred means for forcing radiative cooling.

GENERAL DESCRIPTION

The production of coherent light in a gas discharge laser requires an elongated straight tube or bore 1 (shortened in the drawing), in which a gas column is excited by an electric current Ie. Windows W enable the tube to apply its gain within an optical cavity comprising mirrors M1 and M2, to cause oscillation that delivers output by partial transmission through either mirror, but in this case through mirror M2. The mirrors are omitted in some of the figures.

Tube Size Considerations

It is appropriate to the discussion of tube size and particularly of bore DIAMETER to note that the present invention teaches several means which cooperatively assist in the pre-saturating of the bore. Even in an unimproved Smith tube the smallest of bores might be saturated using only the bore-conditioning method without the tube improvements and methods for densifying the gas. Some but not all of the improvements will be required in medium-bore lasers. The choice as to which ones are used can be a matter practical considerations, but multiple means are taught here because all might be required in the largest bore tubes. Large bore tubes run at lower gas density, so their initial fill pressure is typically lower, yet their greater wall area needs more atoms in the column to accomplish saturation. These tubes are important because they deliver higher power and have better efficiency.

The LENGTH of the bore in commercial laser models is sometimes influenced by the needs of a single high-volume application, but more often it is influenced by the voltages and current-carrying capacities of commonly-used power lines. Along with the bore diameter, the length of the bore determines the discharge impedance and therefore the amount of current the tube will draw, so there might be a tube model that delivers the most output that a 120 volt, single phase outlet can power, and another corresponding similarly to a 208 or 220 volt, single phase line, and another corresponding to a 208 volt, three phase line, or to other types of lines commonly used outside the United States. This design practice helps to avoid the weight, cost, and extra heat dissipation that voltage transformers would otherwise add to the product. To suggest a preferred bore length would be as needlessly restrictive as to suggest a preferred bore diameter.

In all of the four tube embodiments, current for the light pulse excitation is provided by one or more rectifying, AC-driven, D.C. Power Supplies PS whose output voltage might be typically between 150 and 600 volts, depending on the size of the tube. Those tubes that pass current in two directions could use DUAL supplies when they run on a single phase power line, to reduce the effects of power supply ripple by having one supply recharge its filter capacitors while the other is driving the tube. A high voltage trigger source, not shown, applies a rapidly-rising ignition pulse to a wire electrode Tr alongside the bore enclosure 2 or spirally wound around it. The trigger helps to create the initial ionization of the column that puts it into its keep-alive mode. In the tube of FIG. 1 with a single direction of current a low-current DC "glow" discharge current Ig can be the keep-alive means. The magnitude of the current Ig is governed by the sum of the resistances of resistors Rg and Rp. In two-direction tubes, like that in FIG. 3b and particularly the high power tubes, like that of FIG. 2, in which it is important to minimize standby mode heat dissipation, the switching devices SD3a, SD3b, SD4a and SD4b are driven by square wave signals from the microcomputer to apply an AC keep-alive current of suitable value without the dissipation of a glow resistor. For this purpose the separate power supply PS2 supplies the voltage appropriate for the particular tube.

Figure 3A:
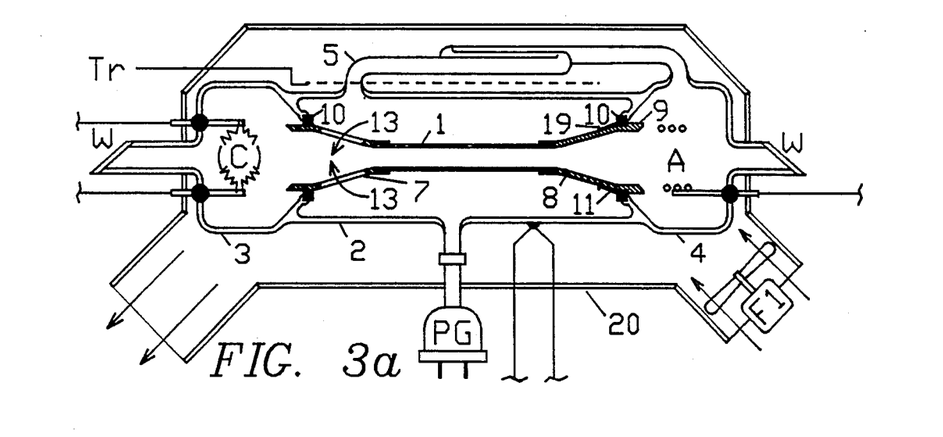
FIGS. 3a and 3b show simpler improved tubes of both types which are designed to have only a hot section, so neither of these tubes requires a ballast valve.

In the single direction tube of FIG. 1, and that of FIG. 3a, the full-current pulse Ie is switched on each time light output is called for, as the driver turns on the switching device SD1, which shorts out both the glow resistor Rg and the pumping resistor Rp and causes full supply voltage to be applied across the tube. Only the discharge impedance limits the current. Each time the switching device is turned off the current returns to the lower value Ig of the glow discharge. This method of pulsing a tube from a lower level discharge is known in the art.

Figure 2:
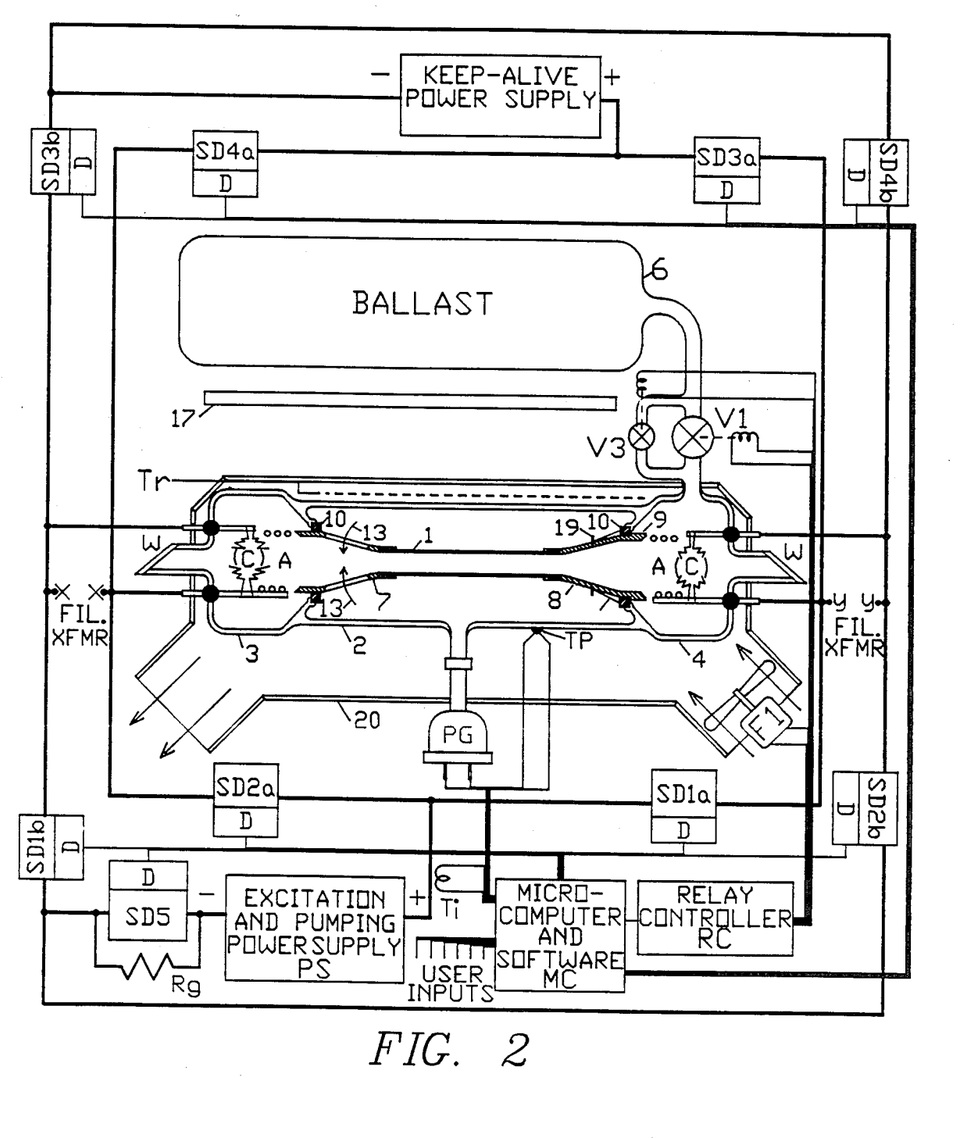

In the preferred embodiment for large-size, two-directional tubes shown in FIG. 2, multiple switching devices SD1a, SD1b, SD2a and SD2b are actuated in pairs in programmed succession to apply current to the tube in alternating directions. The magnitude of the current can be either the excitation current Ie or the DC glow pumping current Ip, depending upon whether the common switching device SD5 is activated to short out the pumping resistor Rp. When gas pumping is required the polarity applied by the SD1 and SD2 devices determines pumping direction. The value of Rp determines the rate of pumping.

Figure 3B:
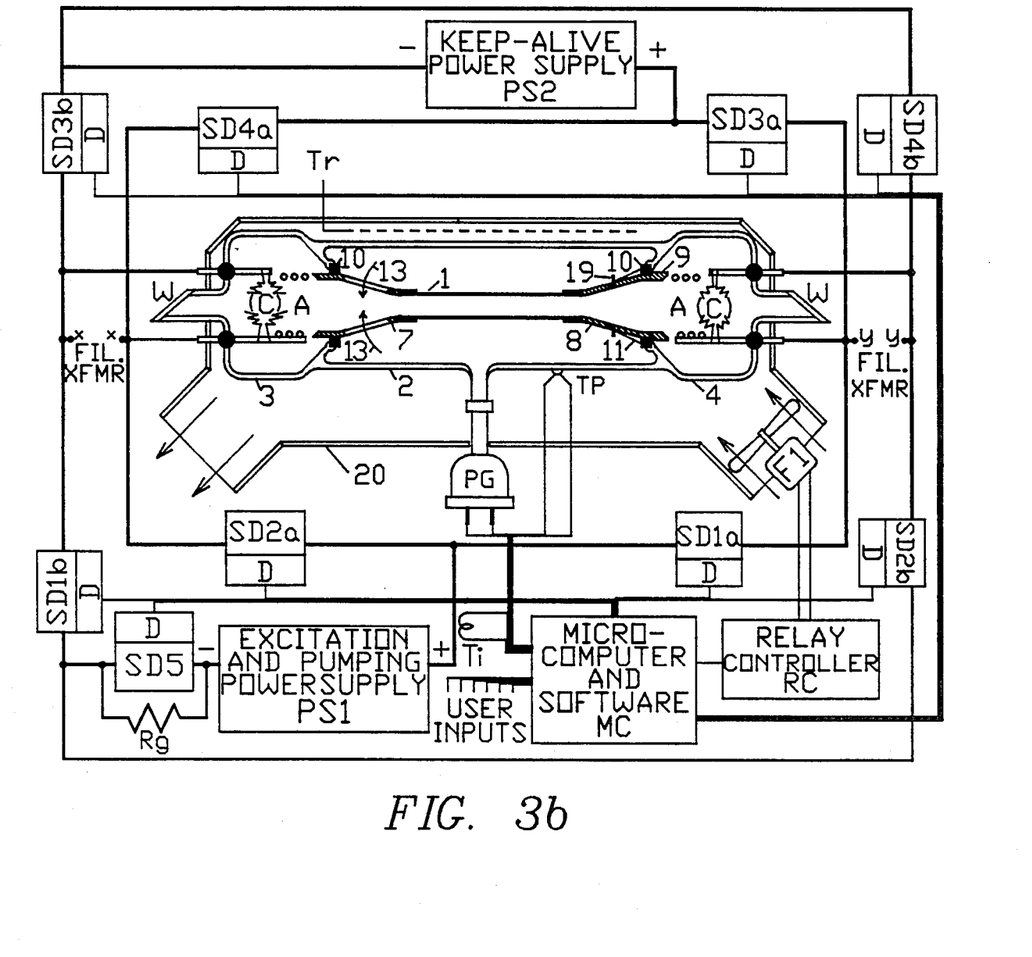

In the preferred embodiments for the non-ballast tubes of FIGS. 3a and 3b there is no valved communication with an appended volume so there is no beneficial utilization of pumping, but there is a cancellation of undesirable gas pumping effects by alternate-direction pulsing in the tube of FIG. 3b.

PRE-SATURATION

The same switching devices that are used for turning on and off the excitation current to produce light output are also used to apply the series of pulses at startup to pre-saturate the wall of the bore. These bore-conditioning pulses should be of long duration to put large numbers of ions on the wall. In their simplest form the pulses will be of predetermined number and have predetermined, constant duration and inter-pulse period, but they can also have pre-programmed, varying durations and/or interpulse periods. As the column thins out its impedance drops and the pulse current goes up, yet there are fewer atoms left to send to the wall, so it would be appropriate to have the pulses get shorter with time. A theoretical case could be made for lengthening the inter-pulse periods with time, but it will take controlled experiments with each tube size and gas medium to determine the optimum combinations.

The microcomputer, with its memory devices, enables the selection of bore-conditioning pulses by means of software, including the use of stored, experimentally predetermined data for the particular tube and gas medium. Because of the computer's speed, parameters can even be adjusted in "real time" during the series of pulses.

When pre-saturation is difficult to achieve some of the pulses can be allowed to continue until the onset of arc starvation, especially in the latter part of the series when timing of the duration of the pulse can be used to determine whether saturation has been achieved. The pulses in an electroically switched laser can be turned off quickly by the switching device at the first "chop" in the current, without harm to the switching device or to the tube, if the circuit is designed for low inductance.

When pulses are allowed to go to the limit the current transformer Ti senses the first downward chop in the current and signals the switching device to terminate the pulse. The microcomputer times the pulses and compares their duration against an empirically established, stored value to determine progress toward saturation and when saturation has been reached. The number of pulses used would not have to be predetermined in this case. A pulse lasting longer than it could have without wall saturation is the signal that terminates the series and initiates the standby pulsing that maintains saturation, after whatever number of pulses has been required. In the same way, pulse durations indicative of partial saturation can be used to adjust duration and/or inter-pulse period of the remaining pulses of the series. Inter-pulse period is significant because it is the time during which gas atoms in the column return to more uniform distribution after a local shortage has caused starvation and pulse termination. In some cases the duration information might have to be supplemented by other tube information such as gas pressure and temperature to make it a positive and accurate indication of saturation, because a column with high gas density sustains longer pulses than one whose density has been thinned by the heat input of the pulses.

Thermal Shock

Thermal shock to the bore during these first pulses is moderated because the tube is cold. The gas will be denser than usual and the impedance higher than usual. The methods provided for increasing the startup gas density increase the impedance further and lessen the shock further, so the pulses can be allowed to have long duration without resorting to a special, lower-voltage power supply and duplicating the switching devices.

There is an impedance effect during the pre-saturating pulses that tends to moderate local arc starvation. As ions are given up to the wall at a higher-than-average rate in some local segment of the bore the effect is to make the gas locally thinner and the impedance locally lower. This means the local voltage drop per unit length and the I×E dissipation per unit length are lower than in the rest of the column, hence there is a moderation of local thermal shock effects. Only as the arc starves at that location does the voltage, and hence the wattage, concentrate at the starved segment, but at that moment the chopping signal quickly cuts off the switching device and little energy is delivered.

Nevertheless, thermal shock considerations in some applications calling for long pulses in large-bore, high-current tubes might call for quartz as the bore material in place of the refractory ceramic of the Smith tube, but in applications where high average drive is required alumina or berylia would still be the better choice. See the discussion of bore resistivity below.

Maintenance of Saturation

It is easier to achieve a high degree of saturation of the wall while the bore is relatively cool than to maintain it when the bore is at a high temperature, such as the temperature prevailing immediately following a high-average-power burst of pulses. Resistivity of the bore material is lower at high temperature, so the recombination rate of ions and electrons goes up. However, the difference may not be significant if a material like high-purity alumina or berylia is used. These materials have a volume resistivity of $4.7 \times 10^{*}7$ and $1 \times 10^{*}8$ ohm-centimeters at 900 degrees C. There is no data available at the higher bore temperatures these ceramics could withstand, but extrapolation of data points suggests a continued ability of the wall to maintain saturation. Nevertheless, it is possible to predict what WOULD occur if a tube was driven so hard that lowered resistivity made it difficult to maintain a high degree of saturation. The maintenance of saturation would require a higher standby duty factor to offset the higher recombination rate. Air cooling of the laser would become less feasible, so the alternatives of finding a better bore material or settling for a lower maintenance level may be preferred.

If a lower saturation level is used each new burst of pulses must bring the saturation back up to 100 percent. The gas for doing it would have to come from the column's reserve of neutrals. Percent ionization is typically between 10 and 20 percent, so the reserve is significant. And in the tubes and methods of the present invention the reserve is not heavily taxed by other causes of transient depletion. Furthermore, if the application does not involve particularly fast changes of the average duty factor the means described below for regulating tube gas density with average duty factor can apply a positive pressure function to help maintain the column reserve. But if the application calls for very abrupt increases of duty it would be preferred to have a higher starting gas density and a constant-pressure function from the regulator.

Gas Density Regulation

The tube construction and operating method for regulating gas density during laser operation will be described with reference to FIG. 1, but they also apply to the other embodiments.

The solenoid-operated valve V1 divides the discharge tubes of FIGS. 1 and 2 into a hot section and a cool section. The hot section consists of: the bore 1, bore envelope 2, cathode envelope 3, anode envelope 4, and the gas return tubing 5. The cool section consists only of the ballast reservoir 6. In the simpler tubes of FIGS. 3a and 3b the entire tube volume is the hot section and no valve is required for the gas density regulation.

During laser operation the temperature functions of the bore and of the hot section envelopes with respect to a reference level at standby drive are determined by the rates at which each receives heat and disposes of heat. The hot section envelopes are heated by radiation that is largely proportional to the duty factor. The envelopes 2, 3 and 4 are heated by radiation from the bore 1, the cathode C and the anode A. The radiation from the bore and anode both vary directly as the duty factor, and that from the cathode varies similarly but has a fixed component from its heater current. The overall heat input to the envelopes will therefore vary approximately as the duty factor. The gas return tubing 5, which joins the cathode and anode vessels in the single-direction tubes of FIG. 1 and FIG. 3a, has no heat source of its own, but it does have a large surface area that can receive radiated heat. Since it traverses the length of the tube it is convenient to place it alongside the bore envelope in order to heat its walls with duty-proportional radiative heat from the bore. In the preferred embodiment the gas return tubing, and the envelopes, are made of a high temperature glass such as Pyrex, which has fairly high absorption in the infra-red and near infra-red.

The heat disposal of the hot section envelopes is by conduction and convection, because they do not become hot enough for significant radiative transfer. Conduction and convection vary as the first power of temperature. Stated conversely, the envelope temperatures will vary as a first power function of the heat being transferred from them (the tube drive). Pressure follows temperature in a fixed volume (the PVT Law). The density regulation balances the pressure in the fixed-volume hot section envelopes against that in the bore that increases its temperature and pressure as the fourth root of the duty factor (the Stefan-Boltzmann Law). Therefore the envelopes might even force too much gas into the bore as duty goes up, were it not for a rate-selectable cooling of the envelopes, represented by the fan F1, which controls and limits the envelope temperature. The overall function takes into account that the envelopes' first power temperature function is not based upon absolute temperature as the bore's temperature function is, but rather on the temperature differences between the envelopes and the cooling air moving across them, and that the bore's heat transfer is not really at a fourth power rate of the Stefan-Boltzmann Law because it does not radiate to free space at absolute zero but to walls of a laser housing, which are at nominal temperatures.

One of the methods used for determining the rate of extraction of heat from the envelopes fixes the rate in a particular tube to produce an approximation of the desire envelope temperature function as tube drive increases. A further improvement in method of operation selects from a group of heat extraction methods which provide continuously-varying control over the rate at which heat is extracted, while the laser is running. Some methods in the group use a controllable vane in the air ducting which varies the mix of ambient intake air and recirculated air to vary the rate of heat extraction. It is a method known to the temperature-controlling art and it is not illustrated in the figures.

The fan also plays a part in the tube's gas transfer functions, being turned on or off depending upon whether a cold or hot envelope will assist the transfer.

It is important to the foregoing teaching that the reader appreciates that the temperature and pressure functions discussed are those that apply with respect to the standby level or to other low average levels of tube drive, and not with respect to cold or "off" conditions. The initial rise from "off" conditions is of no consequence because the regulating process starts from a reference pressure that is set after the tube has heated up.

Gas being driven into the bore during laser operation by increases of tube drive above the reference level seems to contradict the earlier statement concerning bore-conditioning that no gas can enter the bore during the pre-saturating pulses, but in those pulses the reference level is room temperature because there has been no prior thermal input to the bore, and the large increase in bore temperature from room ambient, needed to begin the radiating of heat, is an increase that the envelope temperature cannot begin to match, especially in view of the envelope thermal inertia. This same envelope thermal inertia is what makes the gas regulating method responsive only to the average levels of tube drive.

For most ion lasers the benefit of gas density regulation will come from the maintenance of optimum efficiency over a wide range of duty factors, not so much to save on electrical cost as to minimize heat production and extend the convenience of air cooling to higher-power laser applications.

MEANS FOR MANIPULATING GAS DENSITY IN THE DISCHARGE TUBE

The valved division of the tube into hot and cool sections is the key to a number of devices and processes that are able to alter gas density in the tube. It provides a first benefit of permitting the tube to begin each period of operation with a predetermined density of gas in the hot section that is optimum for light production. Tube construction and methods of operation to provide this are claims of the invention, as are methods for providing gas densification for the pre-saturating process.

Of the various devices and methods used for gas management the first relates to the gas regulating means described above. It uses the ability of the temperature rise in the envelopes 2, 3, 4 and 5 to push gas through the electrically-actuated valve V1 into the unheated ballast 6, to allow a higher fill pressure by furnishing means and methods for thermally driving surplus gas back into the ballast before lasing operation begins. The ballast valve V1 is opened, and discharge pulses at a high duty factor are turned on. As the bore gets hot it radiates infra-red to the envelopes 2, 3, 4 and 5. The spectrum of this radiation is a broad, near-black-body continuum that widens toward the visible as the bore gets hotter. Some of the near-visible infra-red is transmitted through the envelope, but the longer wavelengths, which dominate as the bore begins to heat up, are highly absorbed, and the heat cooperates with the increased heating of the bore, anode, and cathode to heat the contained gas and drive it into the cooler ballast until the right pressure for laser operation is achieved. Either the air cooling duct 20 or the insulating baffle 17 can be the means for shielding the ballast from radiated heat. The gas density left in the hot section follows PVT law as pressure equilibrates in the two sections and the quantity of gas atoms left in each section is determined by the ratio of their absolute temperatures. The pressure gauge PG in the bore envelope is a thermocouple gauge which in reality senses gas density. The microcomputer MC reads the desired gauge value, closes the ballast valve V1, terminates the high-duty pulsing, and initiates the standby pulses.

Since V1 opens only briefly at one stage in the process it makes sense for it to be of the normally-closed type, so that pressures will be maintained even when the power is off.

Gas Transfer by Pumping Action

The characteristic gas pumping of the discharge can provide a much stronger and much faster gas transfer than can the thermal process just described. In the single direction tube of FIG. 1 the ballast valve V1 is placed so as to join the ballast to the hot section at its anode end. Then a second valve V2 in the gas return tubing 5 provides ability to stop the return of pumped gas to the cathode end, thus diverting it into the ballast whenever V2 is closed and V1 is open. Unlike the valve V1, the bypass valve V2 is of the normally open type, since it closes only briefly. Because V2 is always closed when V1 is open, and vice versa, the two valves could be combined into one "double-throw" valve. However, they are not shown as such in the preferred embodiment because of doubts about commercial availability.

The discharge action that provides the pumping can take various forms. Repetitive, high-current pulses do pump gas, but not very efficiently. And even at high duty factor the off time is much longer than the on time so pumping pressure is lost to "backflow".

By coincidence the gas pressures at which these tubes operate correspond to a region of very favorable pumping by a moderate level of continuous glow current. It is a level higher than would be used as a keep-alive current, but it is worthwhile to provide the additional switching device and glow resistor to achieve the faster pumping. In some cases it may be necessary to superimpose pulses for maintaining the saturation when glow current pumping is used.

The resulting higher pressure that either pumping method provides enables a higher fill, and, in view of the large ballast volume, it provides a substantial lifetime supply of gas without the need of a dedicated gas-add reservoir. See Gas-Add heading below.

In krypton ion lasers there is a further need to change the gas density as the user shifts between red and yellow outputs. The pressure can be shifted by a change of envelope cooling in any of the four tube embodiments, but in those with a valved ballast it can also be changed during laser operation by adding gas from the ballast or by initating a special gas driveout step.

Use of Higher Gas Density in the Pre-Saturation Process

The higher fill that thermal transfer and gas pumping provide can also be the means for providing higher column density in a laser to which the pre-saturating method is applied. The benefit obtained depends upon several physical parameters and whether unidirectional or two-directional pumping is used.

To estimate the gas densification that each direction of pumping provides it is appropriate to state some assumptions. Volumes of the hot section and the ballast are considered to be equal. The targeted pressure for laser operation is 25 millitorr. The pressure head of the pumping action is estimated to be 100 millitorr. Although the hot section could be made especially hot during the pumpout step by limiting the cooling of its envelopes, no thermal pressurization will be credited. This assumption is conservative, but it is traded for the not-so-conservative assumption, during the 2nd-direction "packing step" that the hot section temperature remains essentially equal to that of the ballast because of strong cooling of the envelopes.

With 25 millitorr called for in the hot section the ballast pressure can be 100 millitorr higher, or 125 millitorr. Total gas in the two equal volumes is 150 in arbitrary units, and when the valve V1 is opened with the pumping off each volume will contain 75 arbitrary units at a pressure of 75 millitorr. This pressure illustrates the density enhancement of a SINGLE DIRECTION of pumping. If pumping is now applied TOWARD the hot section the pressure there becomes 125 millitorr versus 25 in the ballast. 125 millitor versus 75 millitorr suggests the approximate enhancement of the second direction of pumping. Based on the assumptions given above, the total enhancement is 125/25, or five times the normal pressure of 25 millitorr.

To accomplish the packing step the current in the tube of FIG. 2 is conducted from the cathode C at the right to the anode A at the left, to exhaust gas from the ballast 6 through the valve V1 and pack it into the volume at the left end of the tube comprising the left-end electrode housing 3 and the bore envelope 2. The current is continued until the pressure gauge PG in the bore envelope senses a low rate of change that indicates near-equilibrium.

It is best to apply the packing step at shutdown of the laser so that heat put into the bore and the envelopes by the packing process has time to dissipate while the laser is off. This proceedure provides for a cooler tube at startup when the pre-saturating pulses are applied. And with the normally-closed valve cited above the pressure can be maintained without the power being on.

Whether pumping is in a single direction or two directions, the initial fill pressure put into the tube at the factory must be predetermined to coincide with the tube's ability to pump the extra gas into the ballast before laser operation begins. The tubes of FIGS. 3a and 3b have no separate ballast or valved pumping operation so they cannot be filled with extra gas. Their lack of ballast volume makes them each require a gas-add system, but it is not shown because it is not a claim of the invention.

The temperature probe TP is mounted on the bore envelope, where it can sense excess drive to the tube or signal a failure of the fan F1. It can also verify to the microcomputer that the tube is cool for the beginning of the pre-saturation series. However, such functions are considered to be neither essential nor novel and are not written into the claims.

Cancellation of Gas Pumping in Two-Direction Tubes

The two-direction tubes of FIGS. 2 and 3b can have their excitation pulses applied in alternating directions, so they have a means for cancelling the especially large transient degradation that occurs in dynamic operation, as well as the steady-state pumping effects that occur in all ion lasers. Extra tube electrodes are required, but the gas return tubing is eliminated and the pumping action for gas transfer requires no gas return valve, and as noted above, the resulting tube can even transfer gas in a second direction to pack the hot section.

During the bore-conditioning pulses the same gas pumping effect can cause some of the supply of gas atoms in the column to be lost, but tubes having the ability to apply these pulses in alternating directions, such as those of FIGS. 2 and 3b, can eliminate the problem. A two-directional tube that has packed its hot section with gas and then uses alternating pulses for bore-conditioning has the best chance of pre-saturating the wall of a large bore tube.

Gas-Add Function

The components required for monitoring the need for additional gas during long periods of wide duty operation have already been mentioned in their other functions. In any of the lasers the microcomputer MC constantly monitors the output of the pressure gauge PG.

The gas-add valve V3 is shown in shown in one of the figures, FIG. 2, to illustrate where in the tube it is installed, but it may not be needed. Note that it is in parallel with the ballast valve V1. If the ballast valve and its external circuit are designed for pulsed actuation then the ballast valve can be used as the means to add gas between startups, in spite of its large orifice. But if pumping is very successful in the tubes of FIG. 1 and FIG. 2 the ballast pressure might dictate a smaller-orifice gas-add valve. If so, it would be positioned as shown by V3 in FIG. 2.

Improved Bore Thermal Expansion Means

The rigid bore enclosure of the Smith-type tube requires a means for allowing the bore tubing to grow in length as it becomes hot. As noted in the "BACKGROUND" the Smith patent shows throats with counterbores into which the bore ends slide and by which they are supported. To eliminate the gaps or discontinuities of diameter from the active gas column requires that the longitudinal expansion be allowed elsewhere.

The Smith design has a close enough fit at both ends between the bore and throat to shut off the possibility of an arc from cathode to anode down the outside of the bore instead of down the inside.

The expansion means of the present invention, shown the same in all embodiments, uses only one end to shut off the potential arc. The throat 7 at the left end is purposely vented, so it is the other unvented throat 8 that is relied upon to stop the arc. The bore 1 and the throats 7 and 8 can be cast as one piece or made by bonding two or even three pieces together. This assembly is supported at its two ends by the collars 10 at the cylindrical outer diameter of each throat. As noted earlier the collars are made of a glass-bearing ceramic such as mullite so that they can be fused in place by the glassblower. The inside diameter of the collars provides enough space for radial thermal expansion as the throats become hotter than the collars. The bore assembly is held in place against longitudinal movement by the flange or enlargement 9 on throat 8 and by a spring clip 11 retained by a snap ring 19 in a groove on the outside of the throat. See the enlarge sectional view of FIG. 4b. The spring clip is designed to compress and pass through the collar when the bore/throat assembly is inserted into the glass envelope assembly, then to spring outward. The bore assembly is thusly trapped only at the solid throat end, so the vented-throat end is free to slide in its collar as the bore expands and contracts longitudinally. In all the figures the bore is shown in the hot and expanded condition.

Figure 4A:
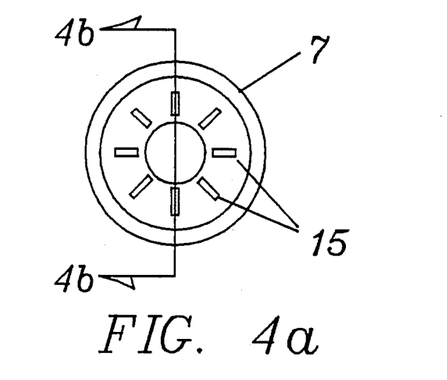
FIG. 4a is an end view of a throat with slotted vents.
Figure 4B:
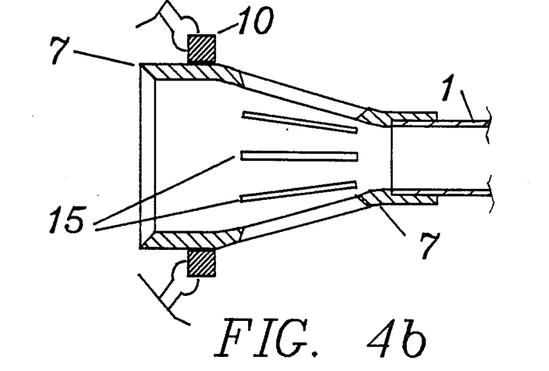
FIG. 4b is a cross section of the throat of FIG. 4a, viewed at the line 4b-4b, showing its support by a collar in which it slides.

Details of the vented throat are shown in the two views of FIG. 4a. Since a single-direction tube is subject to gas pumping toward the anode, as noted above, the first shortage of gas due to combined thermal drive-out and gas pumping will occur in the cathode end of the bore. A pattern of slots 18 through the wall of the cathode throat provides a short path by which gas 13 from the most-rapidly-poressurizing part of the hot section can enter the bore to forestall the onset of arc starvation.

Metallic Treatment of the Bore Wall

Figure 4C:
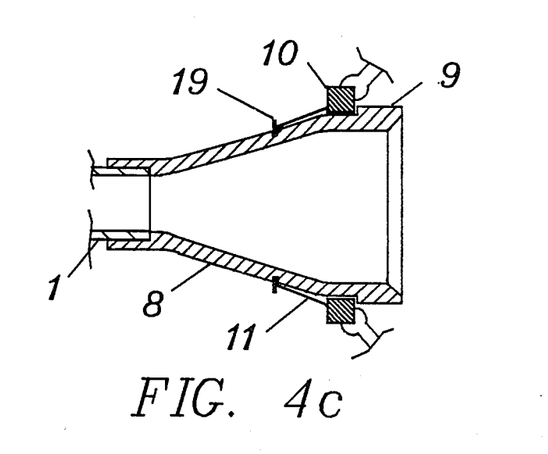
FIG. 4c is a cross-sectional view of an unvented throat, showing its support by a collar in which it is fixed.
Figure 4D:
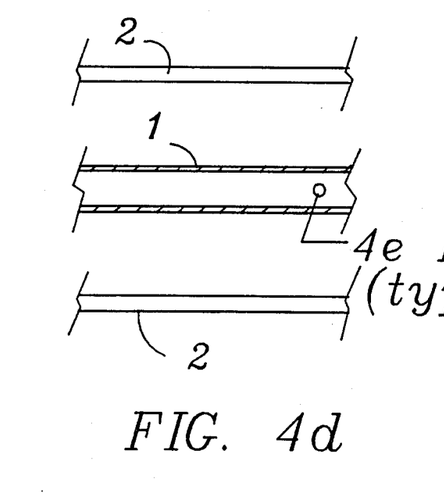
FIG. 4d is a cross-sectional view of a bore-and-envelope segment, used to define the bore surface to which the detail of FIG. 4e applies.
Figure 4E:
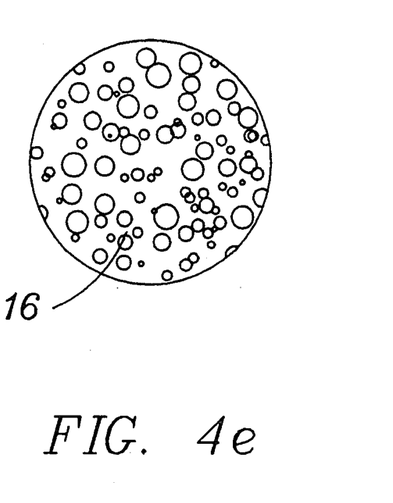
FIG. 4e is a typical, highly magnified detail of a sputtered metal coating applied to the bore surface defined by a small circle at a randomly selected position on the bore as shown in FIG. 4d.

A tube construction means for reducing the number of atoms that a large-bore tube requires for pre-saturation is now described. The preferred embodiment, illustrated in FIG. 4c, uses a bore wall randomly sputtered with small spots 16 of a refractory metal such as tungsten to reduce the non-conductive wall area. The density of these spots is great enough to render a significant percentage of the area conductive, but not great enough for random overlap of spots to provide a continuous current path that shorts out the discharge. (Alternatively, one might use a defined pattern of very high density spots, or of solid metal areas, broken by uncoated strips produced by a masking means). Ions and electrons that land on the conductive areas recombine and return to the gas column as neutral atoms, so only the non-conductive areas use up the atoms available in the column at startup. Like some of the means for increasing the gas density at startup the metallic spots may not be needed in any except large bore tubes.

I claim:

1. In a pulsed gas laser of the type including an enclosed volume of gas, an anode, a cathode, means for providing a defined path through the gas for an electrical discharge current between said anode and cathode, said means including an elongated tubular bore of an electrically-nonconductive refractory material, which defines a column of gas in which a low current keeps the gas ionized and pulses of higher current deliver laser output pulses, envelope means surrounding said bore and enclosing the bore in a low density gas medium that causes heat to be removed from the bore mainly by radiative transfer, a gas return tubing between the end volumes containing said anode and cathode to return gas that is pumped by the discharge current, power supply means coupled to said anode and cathode by electronic switching devices that switch the discharge current from the lower level that keeps the gas ionized to the higher level that produces output pulses, then back again, an electronic pulse controller for setting pulse duration, interpulse period and number of pulses, an improvement of method which pre-saturates the wall of the bore to avoid characteristic interruptions of pulse current and laser output, known in the art as arc starvation, which occur when sustained pulses of current deplete the gas column by sending to the wall of the bore too many of the ions and electrons that are needed for maintaining the current, the pre-saturated wall condition of the improvement enabling a majority of the ions subsequently going to the wall to encounter electrons already on the wall and combine with the electrons to produce neutral atoms that have no electrostatic charge to hold them on the wall and hence are returned to the gas column, the pre-saturating method comprising the steps of: (1) determining experimentally the values of current, pulse duration, interpulse period and number of pulses of a series of bore-conditioning pulses applied to the particular tube model and gas medium, while its bore is cold, which cause the wall of the bore to be covered with a density of ions and electrons that enables a majority of ions subsequently arriving at the wall to encounter electrons and produce neutral atoms that return to the gas column, (2) applying said experimentally-determined series of pulses each time the laser is turned on, but after discharge current has been off long enough for the bore to have cooled to a temperature near room ambient, (3) causing at the conclusion of the series a pre-saturated condition of the bore wall, which is followed by (4) a further step selecting and applying repetitive pulses of reduced duty factor, also experimentally predetermined in step (1) to maintain the saturation through times of low demand in the use of the laser by sending to the wall of the bore during this step more ions and electrons than are given up by the wall during interpulse periods as microcurrents in the relatively noncoductive bore material produce a finite but inherently low rate of spontaneous ion/electron neutralizations and releases.

2. In a pulsed gas laser as defined in claim 1, but having dual cathodes, dual anodes and dual switching devices to enable current flow in either direction through the gas column, the method for applying a series of bore-conditioning pulses to saturate the wall of the bore with ions and electrons in which the current pulses are made to flow in alternating directions by inserting additional steps within Steps (1) and (2) of claim 1, the inserted steps applied after each pulse of Steps (1) and (2) to change the drive to the opposite pair of switching devices, thereby reversing current direction and causing equal numbers of pulses to flow in each direction, avoiding a cummulative pumping of gas which in single-direction tubes of the type diminishes the number and density of gas atoms in the column.

3. In pulsed gas lasers of the type including an enclosed volume of gas, anode and cathode means for enabling electric current to flow through a defined path in the gas, said defined path including an elongated tubular bore of an electrically-nonconductive refractory material, within which a low current keeps the gas ionized and pulses of higher current deliver laser output pulses, enevlope means surrounding said bore and enclosing the bore in a low density gas medium that causes heat to be removed from the bore mainly by radiative transfer, power supply means coupled to said anode and cathode means by electronic switching devices that switch the discharge current from the lower level that keeps the gas ionized to the higher level that produces output pulses, then back again, an electronic pulse controller for setting pulse duration, interpulse period and number of pulses, an improved method for pre-saturating the wall of the bore to avoid characteristic interruptions of pulse current and laser output known as arc starvation, which improved method can be used when the laser is provided with a tube pressure guage, a tube-envelope temperature sensor, a tube-current sensor, a preset timer, a data storage device, and a comparator, for optimizing the four parameters of pulses for pre-saturating the wall fo the bore, namely current, pulse duration, interpulse period and number of pulses, said parameters being experimentally determined in a first step and then used in second step applied each time the laser is turned on, the improvement being to divide application of both steps into two consecutive series of pulses, a first series of pulses for accomplishing partial saturation determined and applied using fixed values of current, pulse duration, interpulse period and number, followed by a second series of pulses using pulses whose interpulse periods and numbers of pulses are predetermined but whose pulse durations are allowed to continue until a predetermined maximum duration unless arc starvation occurs first, in which case the current sensor detects a high frequency oscillatory instability that signals the onset of arc starvation, and this arc starvation signal, applied to the switching devices, causes termination of the pulse current and returns the current to the lower level that keeps the gas ionized the pulses repeating until the series is complete, said improvement also taking into account tube conditions in determining the pulse parameters and applying them in both series of pulses, the steps for doing so being selected from the group consisting of:

(a) a first step for determining, at a typical value of tube pressure within the normal operating pressure range and at a tube temperature near room ambient temperature, the interpulse periods and numbers of first series pulses and second series pulses, as heretofore defined, that are adequate for the partial and complete saturating of the wall of the bore, followed by a second step of each series, applied each time the laser is turned on, for applying the pulses of each series with predetermined interpulse periods and numbers pulses, adding pulses to provide a margin of safety for normal variations within the range of starting tube pressures and ambient room temperatures, (b) the same two steps as in (a) but with numbers and interpulse periods of the first and second series of pulses predetermined for a typical range of tube pressures sensed by the pressure guage and then applied, each time the laser is turned on, with the numbers and interpulse periods determined by the actual tube pressure measured by the guage when the tube is turned on, (c) the same two steps as in (a) but with numbers and interpulse periods of the first and second series of pulses predetermined for a typical range of tube temperatures sensed by the envelope temperature sensor and then applied, each time the laser is turned on, with the numbers and interpulse periods determined by the actual tube temperature measured by the sensor when the tube is turned on, (d) the same two steps as in (a) but with numbers and interpulse periods of the first and second series of pulses predetermined for a typical range of tube pressures and tube temperatures sensed by the tube pressure guage and the envelope temperatures sensor and then applied, each time the laser is turned on, with numbers and interpulse periods determined by the actual tube pressue and actual temperature measured when the tube is turned on, (e) The same two steps as in (d) with an additional step in which the same arc starvation signal that ends each second-series pulse is applied to the preset timer for completion of a pulse duration measurement by the preset timer, which duration value is compared by the comparator against a stored value which is a value longer than the time that current could be sustained in the absence of wall saturation, so that when measured time exceeds the stored value saturation is known to be achieved, and the output from the comparator is applied to the electronic pulse controller to end the second series of pulses, (f) The same steps as in (e) with an additional step to use the comparator output from each pulse duration measurement as a measurement of progress toward saturation and use its output to increase subsequent interpulse periods to increase the time for redisturibution of gas atoms within the column and thereby improve the saturating process whenever poor progress, indicated by early arc starvation, reveals the need to do so, and until pulse duration has increased and the measured duration of a pre-saturating pulse exceeds the sotred value and the comparator signal applied to the pulse controller ends the series of pulses.

4. In a pulsed gas laser of the type including an enclosed volume of gas, an anode, a cathode, means for providing a defined path through the gas for an electrical discharge current between said anode and cathode, said means including an elongated tubular bore of an electrically-nonconductive refractory material which defines a column of gas in which a low current keeps the gas ionized and pulses of higher current deliver laser output pulses, envelope means surrounding said bore and enclosing the bore in a low density gas medium that causes heat to be remove from the bore mainly by radiative transfer, a gas return tubing between the end volumes containing said anode and cathode to return gas that is pumped by the dischargae current, power supply means coupled to said anode and cathode electronic switching devices that switch the discharge current from the lower level that keeps the gas ionized to the higher level that produces output pulses, then back again, the improvement comprising: tube construction means for obtaining a positive gas density regulation defined by an increasing density in the gas column as the tube drive increases, said means comprising a construction which limits the gas-containing volume, to which the gas in the column communicates, to those containers such as the bore envelope, cathode and anode envelopes and gas return tubing, which physically surround the heat-producing bore, anode and cathode, so that their envelopes, and indirectly the gas within them, are heated by infra-red radiation from the parts surrounded and experience a temperature increase, and in the fixed volume a pressure increase, that is proportional to the increase of tube drive, making the increase of envelope temperature and pressure greater than that of the fourth-root increase of bore temperature and gas column pressure determined by the bore's dependence upon radiative heat transfer, and thus able to prevail in equilibrating of the two pressures, and cause envelope gas to move into the bore, and by determining the quantity of envelope gas that moves into the bore determines the amount by which gas density in the column is increased by the drive increase.

5. In a pulsed gas laser as described in claim 4, the improvement comprising: tube construction means for providing the additional gas supply of an appended ballast volume while retaining the positive gas density regulation of the tube of claim 4, said means comprising an appended, unheated ballast shielded from tube radiation, a remotely operable ballast valve through which the appended ballast is joined to the tube of claim 4, said valve remaining closed except during steps to transfer gas, thereby preventing the appended ballast from being a place to which gas can retreat from the gas column or tube envelopes, and enabling, with tube envelopes as described in claim 4, the same increase of gas density with increase of tube drive as that of the tube without an appended ballast of claim 4.

6. In a pulsed gas laser of the type including an enclosed volume of gas, a gas pressure guage sensing pressure in the envelopes, an anode, a cathode, means for providing a defined path through the gas for an electrical discharge current between said anode and cathode, said means including an elongated tubular bore of an electrically-nonconductive refractory material which defines a column of gas in which a low current keeps the gas ionized and pulses of higher current deliver laser output pulses, envelope means surrounding said bore and enclosing the bore in a low density gas medium that causes heat to be removed from the bore mainly by radiative transfer, a gas return tubing between the end volumes containing said anode and cathode to return gas that is pumped by the discharge current, an appended ballast volume communicating with the envelopes at the anode end through a remotely-operable ballast valve, power supply means coupled to said anode and cathode by electronic switching devices that switch the discharge current from the lower level that keeps the gas ionized to the higher level that produces output pulses, then back again, a construction which limits the gas-containing volume to which the gas in the column communicates, other than that of the appended ballast volume, to those containers such as the bore envelope, cathode and anode envelopes and gas return tubing, which physically surround the heat-producing bore, anode and cathode, so that their envelopes, and indirectly the gas within them, are heated by infra-red radiation from the parts surrounded and experience a temperature increase, and in the fixed volume a pressure increase, that is proportional to the increase of tube drive, an improved method of operation for enabling a higher-than-usual fill pressure, for providing more gas atoms in the column for bore conditioning a greater reserve of gas in the appended ballast volume for setting the correct gas pressure for laser operation each time the laser is turned on, and for adding gas while the laser is in operation, said improved method comprising: a first step applied at the time of manufacture to fill the tube to a predetermined pressure higher than its optimum operating pressure, a second step applied thereafter each time the laser is turned on for opening the remotely-operable valve to the appended ballast volume and driving the switching devices to produce current pulses of high enough duty factor and for a long enough time to raise the temperature of heated parts of the tube sufficiently to push surplus gas into the unheated, appended ballast volume until the optimum operating pressure is sensed by the gas pressure gauge, a third step to close the valve to block the return of gas from the appended ballast volume, a fourth step to commence laser operation, and a fifth step, applied as needed during any operating cycle, to open the valve briefly to add gas during periods of operation that are long enough for gas cleanup loss characteristic of ion lasers to reduce significantly the density of gas in the column and require an addition of gas.

7. In a pulsed gas laser as described in claim 5, with a gas pressure gauge sensing pressure in the envelopes, the further improvement comprising: means for using the characteristic gas pumping of the tube current to drive gas into the appended ballast before laser operation begins to enable a higher fill pressure, to provide more gas atoms in the column for bore-conditioning and a longer lasting reserve of gas in the appended ballast volume from which to set the correct pressure each time the laser is turned on and from which to add gas during laser operation, said means comprising an appended ballast volume connected to the laser tube through a remotely-operable valve as provided in claim 5, but specifically connected at the anode envelope where gas pumping by the discharge current generates positive pressure, another remotely-operable valve in the gas return tubing near where it joins said anode envelope, an electronic switching device for applying, with the gas return valve closed and the appended ballast valve open, repetitive pulses or continuous glow current to pump gas from the tube envelopes into the unheated, appended ballast volume until the correct pressure for laser operation is sensed by the pressure guage, causing closing of the ballast valve, opening of the gas return valve, and commencement of the next step of laser operation.

8. A pulsed gas laser as described in claim 5, for obtaining a positive gas density regulation versus tube drive, used in combination with a two-directional construction for alternating the direction of current pulses through the gas column to avoid the particularly severe transient pumping of gas from the column that occurs in dynamically driven pulsed gas lasers because the return of gas through the gas return tubing is a slow diffusion which has little effect against sudden pumping due to increase of duty factor, said two-directional construction comprising: dual cathodes, dual anodes and dual switching devices, an unpolarized means for maintaining ionization between pulses such as an AC excitation of high enough frequency to be reactively coupled to the tube, thereby enabling the dual switching devices to turn on pulse current in either direction.

9. In a pulsed gas laser as defined in either claim 4 or claim 5, a further improvement comprising: the addition of envelope cooling means, whose rate of heat extraction from the envelopes is chosen for producing, at a particular tube fill pressure and a selected drive level, a column gas density that is optimized for maximum laser output at the selected drive level.

10. In a pulsed gas laser as defined in either claim 4 or claim 5, a further improvement for controlling the column gas density throughout a normally-occuring range of tube drives by controlling the temperature of the tube envelopes over said normally-occuring range, said improvement of means comprising: rate-selectable means for extracting heat from the envelopes.

11. A pulsed gas laser as defined in claim 4 for obtaining a positive gas density regulation versus tube drive, used in combination with a two-directional construction for alternating the direction of current pulses through the gas column to avoid the particularly severe transient pumping of gas from the column that occurs in dynamically driven pulsed gas lasers because the return of gas through the gas return tubing is a slow diffusion which has little effect against sudden pumping due to increase of duty factor, and to eliminate the need for a gas return tubing, said two-directional construction comprising: dual cathodes, dual anodes and dual switching devices, an unpolarized means for maintaining ionization between pulses such as an AC excitation of high enough frequency to be reactively coupled to the tube, thereby enabling the dual switching devices to turn on pulse current in either direction.

12. In a pulsed gas laser of the type including an enclosed volume of gas, a gas pressure guage sensing pressure in the envelopes, dual anodes, dual cathodes, means for providing a defined path through the gas for an electrical discharge current between said anodes and cathodes, said means including an elongated tubular bore of an electrically-nonconductive refractory material which defines a column of gas in which a low current keeps the gas ionized and pulses of higher current deliver laser output pulses, envelope means surrounding said bore and enclosing the bore in a low density gas medium that causes heat to be removed from the bore mainly by radiative transfer, a gas return tubing between the end volumes containing said anode and cathode to return gas that is pumped by the discharge current, an appended ballast volume communicating with the envelopes at the anode end through a remotely-operable ballast valve, power supply means coupled to said anodes and cathodes by dual electronic switching devices that switch the discharge current from a lower level alternating current that keeps the gas ionized to the higher direct current, in either direction, that produces output pulses, then back again, an improvement in the method of operation employing two-directions of gas pumping for enabling a higher than usual tube fill pressure to provide more gas atoms in the column for use by the bore-conditioning process, to supply a reserve of gas in the appended ballast volume which is used to set the correct gas pressure each time the laser is turned on and to add gas while the laser is in operation, the improvement comprising the steps of: (1) experimentally determining a fill pressure for the particular tube model and laser gas that is higher than its normal operating pressure by an amount which takes into account additional operating steps, applied each time the laser is turned off to pump gas out of the appended ballast volume to pressurize the tube envelopes, and each time the tube is turned on, but after the bore-conditioning process, to pump surplus gas back into the appended ballast volume before laser operation begins, then applying, also at the time of manufacture, steps (2) through (8) as follows(2) filling the tube to the experimentally determined pressure, (3) opening the remotely-operable valve to the appended ballast volume to distribute the gas of that volume uniformly between it and the tube envolopes, (4) closing the gas return valve, (5) applying repetitive pulses or a DC pumping current to the gas column in the direction that pumps gas from the appended ballast and the tube envelope to which the appended ballast attaches into the opposite end envelope and bore envelope, (6) closing the remotely-operable valve to the appended ballast, (7) opening the gas return valve, (8) turning off the repetitive pulses or DC pumping current and turning off the laser, with a resulting increased gas density in the bore and tube envelopes, so that when the laser is next turned on this increased gas density is present in the bore for the pre-saturating process, and, each time the laser is turned on, the following steps, (9) applying the series of bore-conditioning pulses for pre-saturating the wall of the bore, (10) opening the remotely-operable valve to the appended ballast, (11) closing the gas return valve and (12) applying repetitive pulses or a DC glow discharge current to the gas column to pump surplus gas from the column and tube envelopes into the appended ballast volume until the gas pressure gauge indicates the correct pressure for laser operation, (13) closing the remotely-operable valve to the appended ballast volume, (14) turning off the pumping pulses or glow current and (15) commencing laser operation, then, when laser operation is terminated, repeating steps (3) through (8) to return the tube envelopes to the pressurized state.

13. In a pulsed gas laser of the type including an enclosed volume of gas, a gas pressure guage sensing pressure in the envelopes, an anode, a cathode, means for providing a defined path through the gas for an electrical discharge current between said anode and cathode, said means including an elongated tubular bore of an electrically-nonconductive refractory material which defines a column of gas in which a low current keeps the gas ionized and pulses of higher current deliver laser output pulses, envelope means surrounding said bore and enclosing the bore in a low density gas medium that causes heat to be removed from the bore mainly by radiative transfer, a gas return tubing between the end volumes containing said anode and cathode to return gas that is pumped by the discharge current, power supply means coupled to said anode and cathode by electronic switching devices that switch the discharge current from the lower level that keeps the gas ionized to the higher level that produces output pulses, then back again, a construction which limits the gas-containing volume to which the gas in the column communicates, to those containers such as the bore envelope, cathode and anode envelopes and gas return tubing, which physically surround the heat-producing bore, anode and cathode, so that their envelopes, and indirectly the gas within them, are heated by infra-red radiation from the parts surrounded and experience a temperature increase, and in the fixed volume a pressure increase, that is proportional to the increase of tube drive, a step-selectable means for extracting heat from the envelopes, such as a fan motor offering two or more speeds, a method of operation applicable as well when the tube has an appended ballast volume provided such volume is isolated by a remotely-operable ballast valve, the method providing more than one gas density from the same gas fill pressure, such as is needed for yielding optimized output from more than one wavelength of a laser gas, such as the red and yellow outputs of krypton, and doing so without adding gas to the tube or taking gas out of the tube, the method comprising the steps of: (1) determining experimentally the values of fan speed that provide heat extraction rates from the envelopes which establish, for anticipated drive levels at each wavelength, an envelope temperature and pressure which optimizes output at each wavelength and (2) a step for applying the fan speed thus determined for each wavelength whenever that wavelength is selected during laser operation.

14. In a pulsed gas laser of the type including an enclosed volume of gas, a gas pressure guage sensing pressure in the envelopes, an anode, a cathode, means for providing a defined path through the gas for an electrical discharge current between said anode and cathode, said means including an elongated tubular bore of an electrically-nonconductive refractory material which defines a column of gas in which a low current keeps the gas ionized and pulses of higher current deliver laser output pulses, envelope means surrounding said bore and enclosing the bore in a low density gas medium that causes heat to be removed from the bore mainly by radiative transfer, a gas return tubing between the end volumes containing said anode and cathode to return gas that is pumped by the discharge current, power supply means couple to said anode and cathode by electronic switching devices that switch the discharge current from the lower level that keeps the gas ionized to the higher level that produces output pulses, then back again, a construction which limits the gas-containing volume to which the gas in the column communicates, to those containers such as the bore envelope, cathode and anode envelopes and gas return tubing, which physically surround the heatproducing bore, anode and cathode, so that their envelopes, and indirectly the gas within them, are heated by infra-red radiation from the parts surrounded and experience a temperature increase, and in the fixed volume a pressure increase, that is proportional to the increase of tube drive, a rateselectable means for extracting heat from the tube envelopes, such as air driven across the envelopes at rate-selectable velocity by a variable-speed fan, an improved method of operation, applicable as well when the tube has an appended ballast volume provided such volume is isolated by a remotely-operable ballast valve, the method providing gas densities that are optimized for maximum laser output at two or more drive levels in the laser's normal range of drive, the method comprising the steps of: (1) determining experimentally the rates of extracting heat from the envelopes which provide optimum laser output at drive levels across the laser's normal operating range, (2) determining, while the laser is in operation, the time-averaged drive being applied to the tube, and (3) applying a rate of heat extraction that is optimum for the time-averaged drive level determined in step (2).

15. In a pulsed gas laser of the type including an enclosed volume of gas, a gas pressure guage sensing pressure in the envelopes, an anode, a cathode, means for providing a defined path through the gas for an electrical discharge current between said anode and cathode, said means including an elongated tubular bore of an electrically-nonconductive refractory material which defines a column of gas in which a low current keeps the gas ionized and pulses of higher current deliver laser output pulses, envelope means surrounding said bore and enclosing the bore in a low density gas medium that causes heat to be removed from the bore mainly by radiative transfer, a gas return tubing between the end volumes containing said anode and cathode to return gas that is pumped by the discharge current, an appended ballast volume communicating with the envelopes at the anode end through a remotely-operble ballast valve, power supply means coupled to said anode and cathode by electronic switching devices that switch the discharge current from the lower level that keeps the gas ionized to the higher level that produces output pulses, then back again, an improved method of operation which makes use of the gas pumping ability of the discharge current to enable a higher than usual tube fill pressure to provide more gas atoms in the column for bore-conditioning, and to supply a reserve of gas in the appended ballast volume which is used to set the correct gas pressure each time the laser is turned on and to add gas while the laser is in operation, said improved method comprising the steps of: (1) experimentally determining a fill pressure for the particular tube model and laser gas higher than it normal operating pressure by an amount which takes into account an additional operating step, applied each time the laser is turned on, to use the gas pumping ability of the current in the gas column to pump surplus gas into the appended ballast volume before laser operation begins, (2) filling the tube at the time of manufacture to the experimentally determined pressure, (3) opening the remotely-operable valve to the appended ballast volume each time the laser is turned on to distribute the gas of that volume uniformly between it and the tube envelopes, (4) closing the remotely-operable ballast valve, (5) applying the series of bore-conditioning pulses for pre-saturating the wall of the bore, (6) opening the remotely-operable valve to the appended ballast, (7) closing the gas return valve and (8) applying repetitive pulses or a DC glow discharge current to the gas column to pump gas from the column and tube envelopes into the appended ballast volume until the gas pressure guage indicates the correct pressure for laser operation, (9) closing the remotely-operable valve to the appended ballast volume, (10) turning off the pumping pulses or glow current and (11) commencing laser operation.

16. In a pulsed gas laser of the type including an enclosed volume of gas, an anode, a cathode, means for providing a defined path through the gas for an electrical discharge current between said anode and cathode, said means including an elongated tubular bore of an electrically-nonconductive refractory material, which defines a column of gas in which a low current keeps the gas ionized and pulses of higher current deliver laser output pulses, throat pieces at each end of the elongated tubular bore which have tapered inside diameters to avoid an abrupt discharge transition from the diameter of the bore to that of larger envelopes containing the anode and cathode, envelope means surrounding said bore and enclosing the bore in a low density gas medium that causes heat to be removed from the bore mainly by radiative transfer, a gas return tubing between the end volumes containing said anode and cathode to return gas that is pumped by the dischargae current, power supply means coupled to said anode and cathode by electronic switching devices that switch the discharge current from the lower level that keeps the gas ionized to the higher level that produces output pulses, then back again, the improvement comprising: tube construction means for allowing longitudinal thermal expansion of the bore that retain smooth transitions of shape between the elongated tubular bore and the throat pieces, said expansion means comprising throat pieces bonded to or integrally cast with the elongated tubular bore, with a continuous transition of inside diameter, support at each throat being provided at their outer extremities by loose-fitting circular collars joined to an inside web of the envelope surrounding the bore, one throat piece having a flange or other outward-projecting means at its outer end that cannot pass through the inside diameter of its supporting collar and a spring-clip or equivalent restraining means on the other side of the same collar, which flange and restraining means fix the position of that end of the bore-throat assembly, while elongation or shortening of the bore-throat assembly is allowed by sliding motion between the throat piece and the collar at the opposite end.

17. In a pulsed gas laser as defined in claim 16, bore treatment means for reducing the wall area subject to a pre-saturation process, said treatment means comprising small, randomly-distributed spots of a refractory metal sputtered onto the inside wall of the elongated tubular bore at a density sufficient to reduce the non-conductive wall area but insufficient for random overlapping of spots to provide a continuous current path.

* * * * *